Jan. 5, 1926.
C. H. LAND, JR
1,568,168
TRAILER
Filed March 16, 1922  6 Sheets-Sheet 1
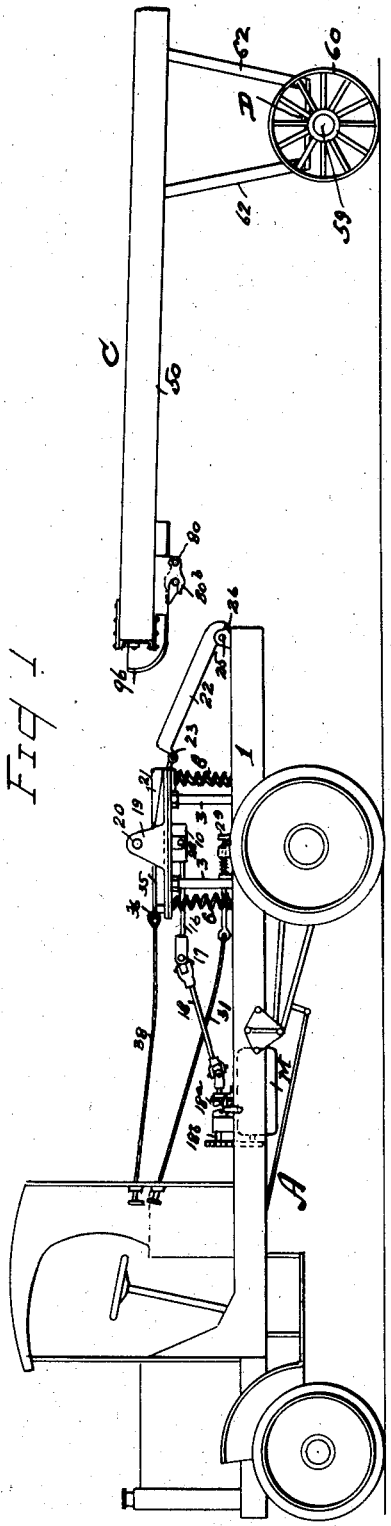
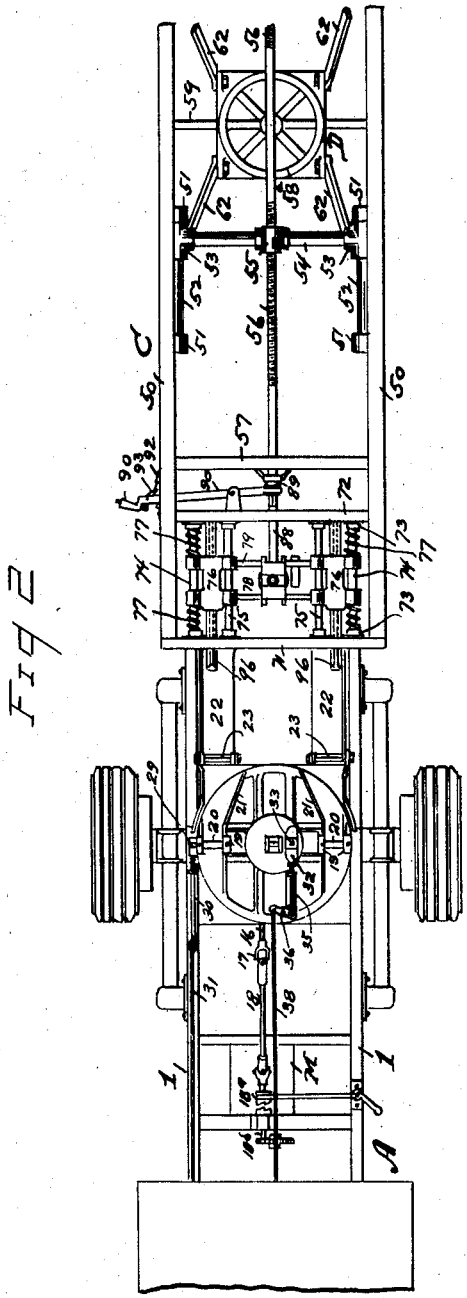
Inventor
Charles H. Land Jr
By S. S. Thomas
Attorney Jan. 5, 1926.  1,568,168
C. H. LAND, JR
TRAILER
Filed March 16, 1922     6 Sheets-Sheet 2
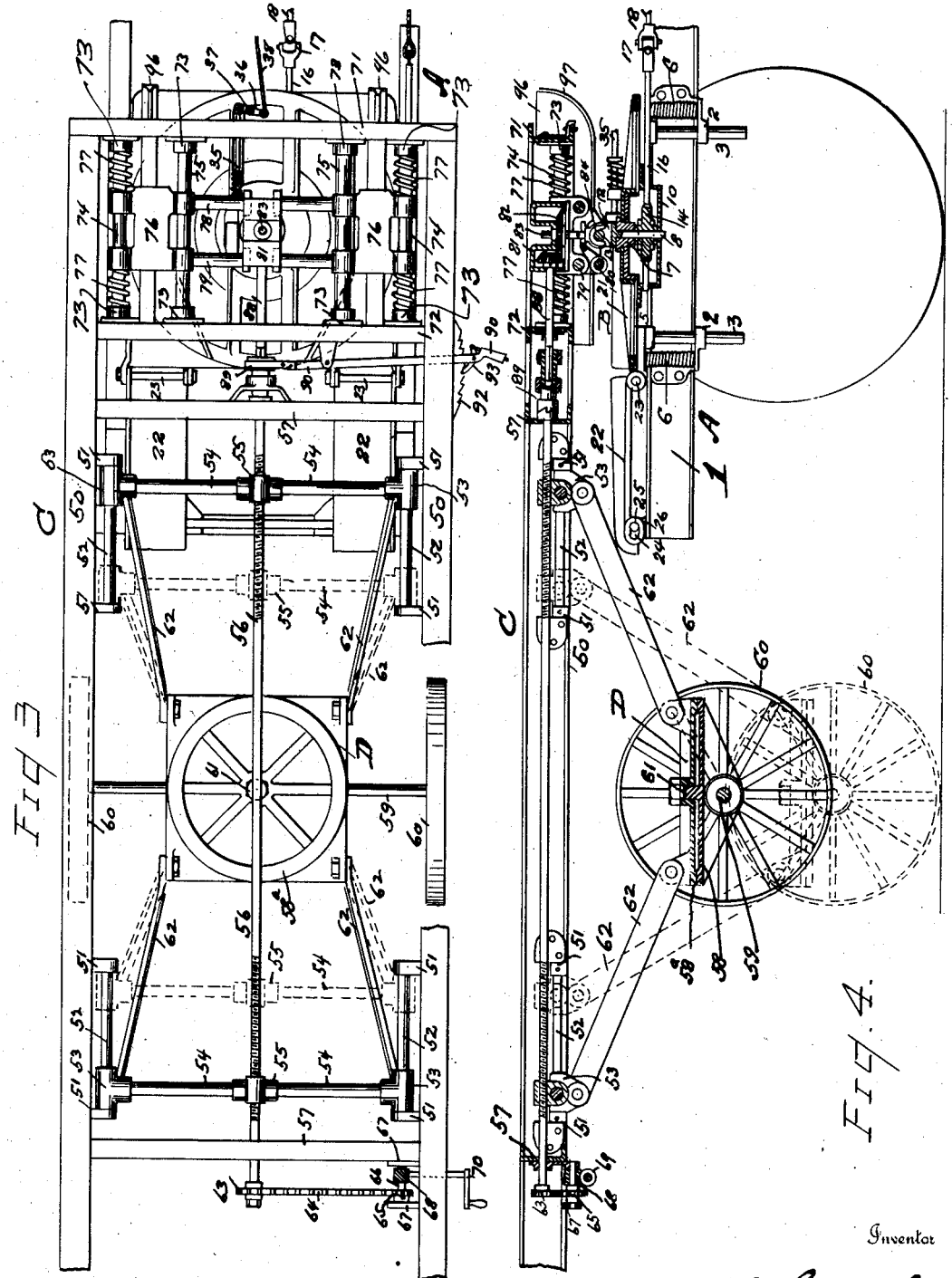

Jan. 5, 1926.

C. H. LAND, JR 1,568,168

TRAILER

Filed March 16, 1922

Inventor
Charles H. Land Jr
By J. E. Thomas
Attorney

Jan. 5, 1926.
C. H. LAND, JR
1,568,168
TRAILER
Filed March 16, 1922    6 Sheets-Sheet 4
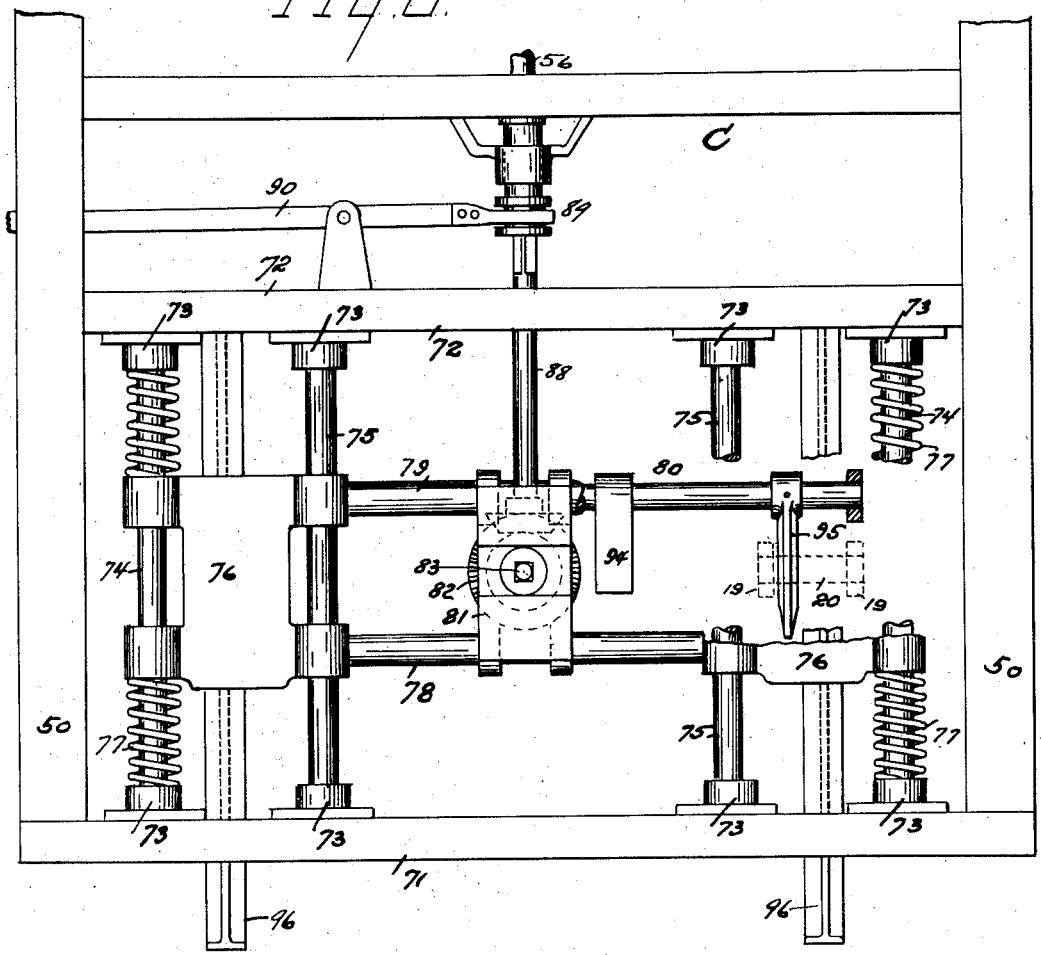
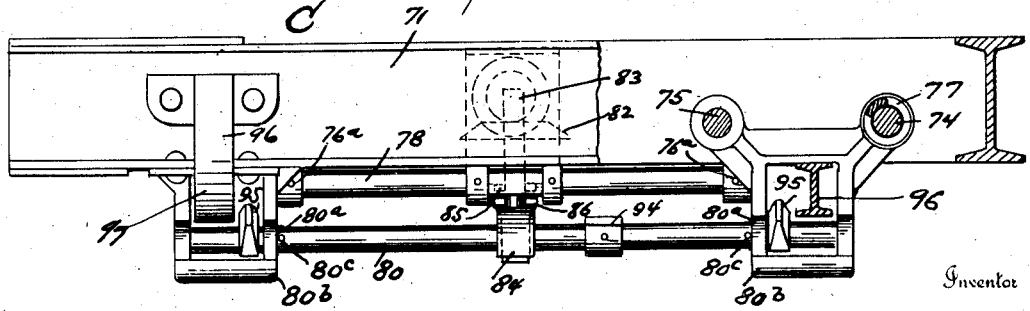
Inventor
Charles H. Land Jr.
By J. E. Thomas
Attorney Jan. 5, 1926.  
C. H. LAND, JR  
1,568,168  
TRAILER  
Filed March 16, 1922   6 Sheets-Sheet 5

Inventor  
Charles H. Land Jr  
By J. E. Thomas  
Attorney

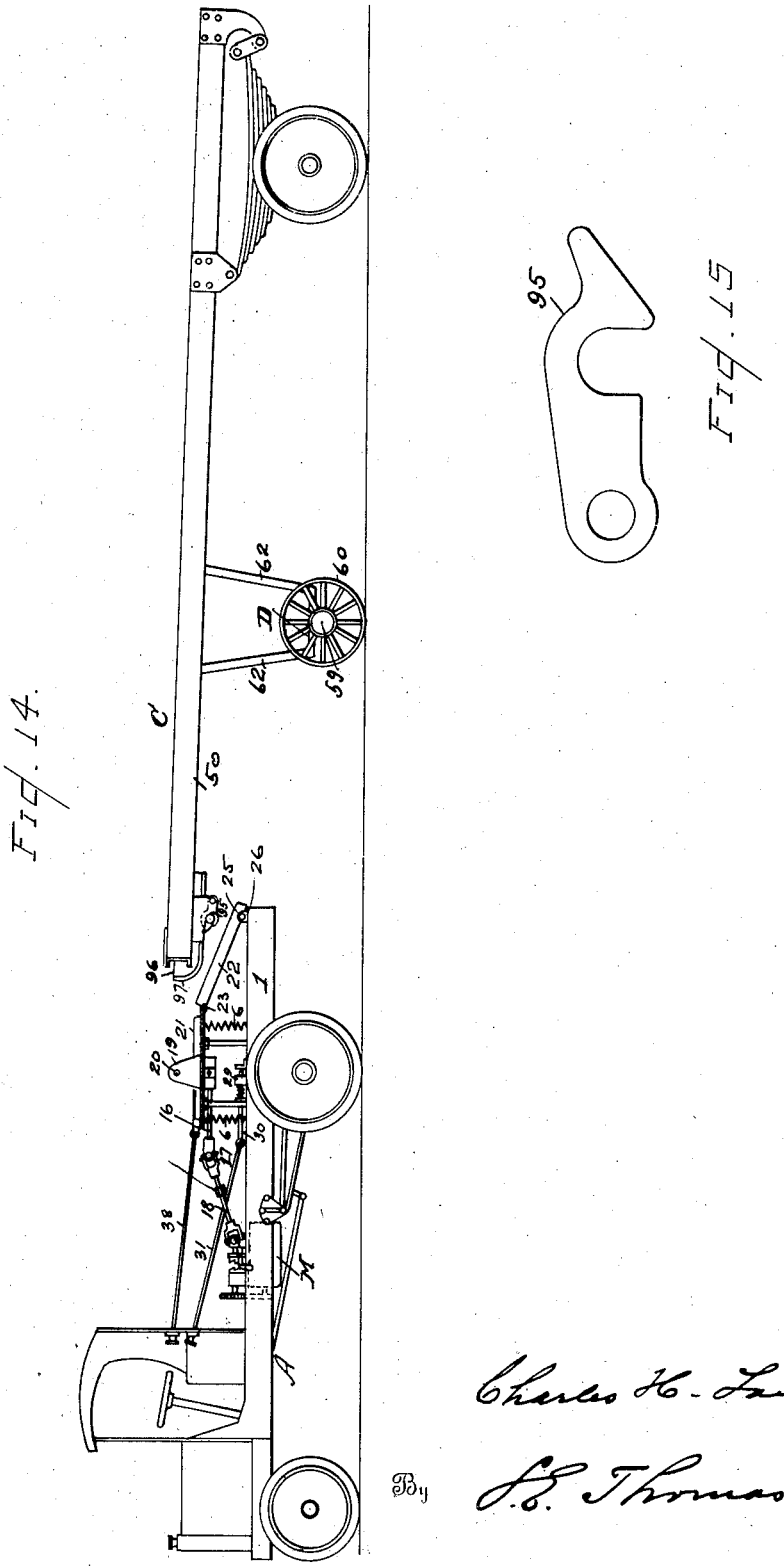

Patented Jan. 5, 1926.

1,568,168

UNITED STATES PATENT OFFICE.

CHARLES H. LAND, JR., OF DETROIT, MICHIGAN, ASSIGNOR OF ONE-HALF TO WILLIAM H. WILSON, OF DETROIT, MICHIGAN.

TRAILER.

Application filed March 16, 1922. Serial No. 544,167.

*To all whom it may concern:*

Be it known that I, CHARLES H. LAND, Jr., citizen of the United States, residing at Detroit, county of Wayne, State of Michigan, have invented a certain new and useful Improvement in Trailers, and declare the following to be a full, clear, and exact description of the same, such as will enable others skilled in the art to which it pertains to make and use the same, reference being had to the accompanying drawings, which form a part of this specification.

My invention relates to a trailer attachment for a tractor-trailer train, the purpose of which is to utilize the power of the tractor for coupling and uncoupling a trailer to the tractor.

The primary object of this invention is to provide a yieldable coupling device whereby a trailer of the two-wheel type fitted with a supporting leg at its forward end may be rapidly coupled to a tractor without the necessity of providing the tractor with skids or inclined guides to lift the forward end of the trailer into coupling position with the tractor.

A further object of the invention is to provide a trailer attachment for tractors which may be raised into a suitable coupling position to receive and engage the trailer.

A further object of the invention is to provide a coupling mechanism between the tractor and trailer whereby the power of the tractor may be transmitted to the trailer.

A further object of the invention is to provide a tractor with a fifth wheel mechanism which when released is adapted to rise automatically to a higher plane, whereby the tractor and trailer may be readily coupled together.

A further object of the invention is to provide a manually operated clutch mechanism for engaging and disengaging the power shaft with the driving shaft of the tractor that the tractor may be first coupled with the trailer, before connecting the power shaft with the drive shaft to operate the leg raising mechanism of the trailer.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

Heretofore in the usual type of automatically coupled trailers fitted with a supporting leg at their forward end it was necessary to lift the front end of the trailer into coupling relation with the tractor by skids or inclined guides extending from the fifth wheel of the tractor, whereby upon backing the tractor toward the trailer the inclined guides would pass beneath the coupling bar at the forward end of the trailer, engaged by the locking latch. It was also necessary to set the brakes of the trailer to prevent the trailer shifting from its position upon backing the tractor into coupling relation therewith.

In this invention skids or inclined guides for raising the forward end of the trailer have been eliminated, the motive power of the tractor being utilized to actuate the supporting leg of the trailer that it may lift the forward end of the latter. The invention further differentiates from the class referred to in providing resilient supporting means for the fifth wheel of the tractor that the latter may be elevated to meet the co-operating coupling means of the trailer, manually operated means being also employed for regulating the height of the trailer through the adjustment of its supporting leg.

In the drawings forming part of this specification:

Figure 1 is a side elevation of a tractor and a fragmentary portion of the front end of a trailer showing the fifth wheel attachment to the tractor in its elevated position prior to coupling with the trailer.

Figure 2 is a plan view of the same.

Figure 3 is an enlarged plan view of the forward end of the trailer coupled with the fifth wheel mechanism of the tractor, showing in dotted lines the position of the mechanism for controlling the supporting wheels when the latter are in their lowermost position.

Figure 4 is a longitudinal vertical central sectional view through the trailer and tractor as shown in Figure 3.

Figure 8 is an enlarged detail plan view of the trailer with parts broken away to show one of the latch locks of the trailer, engaged with the coupling bar of the tractor,—shown in dotted lines—the other latch lock being hidden.

Figure 9 is an end elevation of a trailer frame with a portion of the front sill broken away, and parts in section.

Figure 14 is a side elevation of the tractor and trailer.

Figure 15 is a detailed view of one of the latch hooks.

Figure 5:
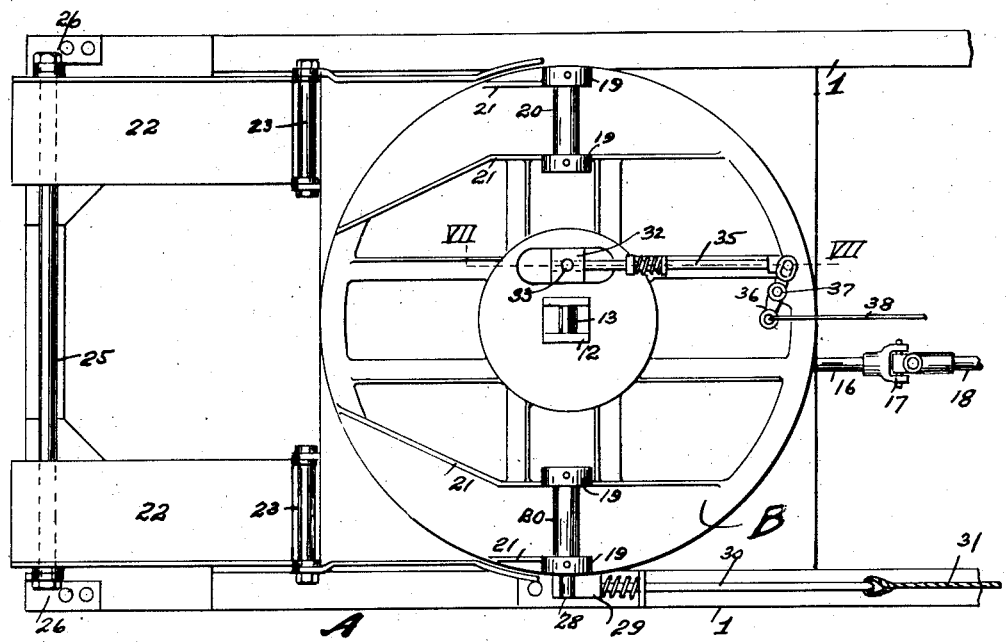
Figure 5 is a plan view of the rear end of the tractor showing the fifth wheel mechanism.
Figure 6:
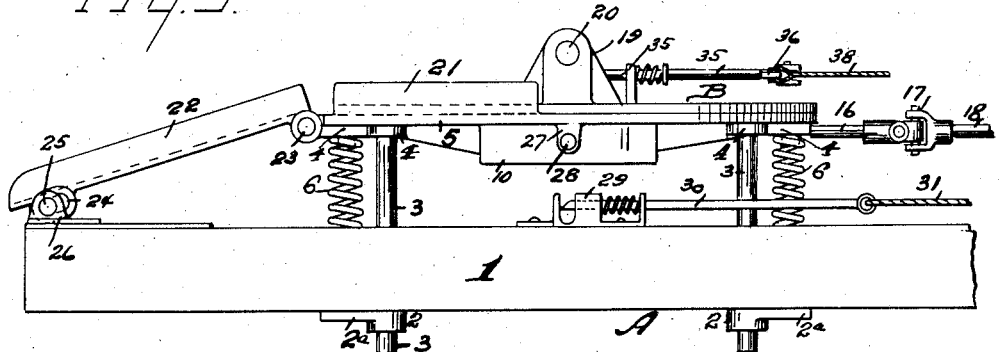
Figure 6 is a side elevation of the same, with the fifth wheel raised through the action of its supporting springs.
Figure 7:
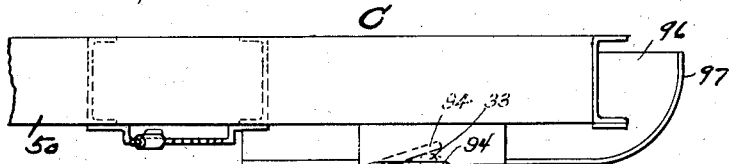
Figure 7 is a fragmentary side elevation of the tractor and trailer coupled together, with parts in section taken on or about line VII—VII of Figure 5.
Figure 11:
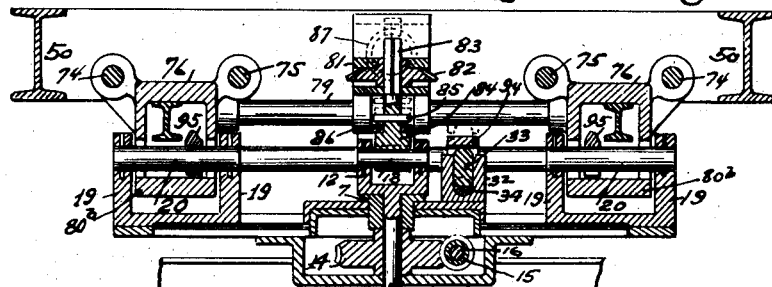
Figure 11 is a vertical cross-sectional view through the tractor and trailer taken at right angles to the preceding view and on or about line XI—XI of Figure 10.
Figure 12:
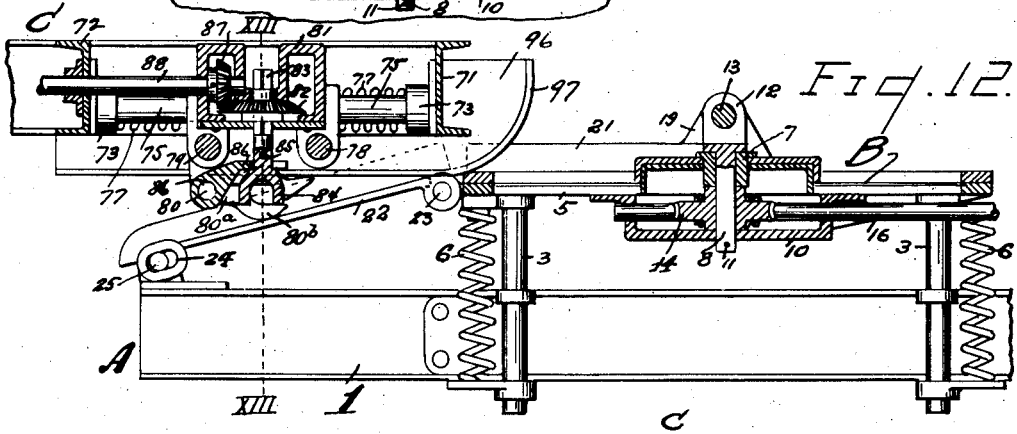
Figure 12 is a longitudinal vertical sectional view through a fragment of the tractor and trailer prior to being coupled together.
Figure 13:
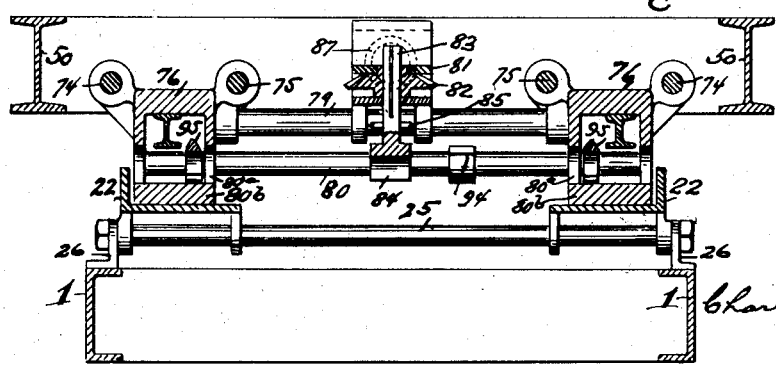
Figure 13 is a cross-sectional view taken on or about line XIII—XIII of Figure 12.

Referring now to the reference letters and numerals placed upon the drawings:

A, in Figure 1 denotes a tractor and 1 its side sills with brackets 2 in Figure 6 bolted thereto in which are sleeved slidable rods 3 pinned to castings 4 which are in turn bolted to the lower member 5 of the fifth wheel B. Adjacent to the rods 3 are springs 6 bearing at one end upon an extension 2ª of the brackets 2 and at the other end against the casting 4 that the fifth wheel may be raised when released from suitable controlling mechanism hereafter described. The upper and lower members of the fifth wheel are held together by a tubular king pin 7 (see Figure 12) through which extends a shaft 8 journaled in the king pin and in the wall of the gear box 10, riveted to the lower fifth wheel member,—the shaft being secured against upward movement by a cotter pin 11 extending transversely through the shaft below the wall of the box. The upper end of the shaft 8 terminates in a yoke 12 in which is supported a transverse gear-coupling shaft 13, (see Figure 11), pinned to the tines of the yoke. A worm gear 14 is keyed to the shaft 8 and a worm gear 15 in mesh with the gear 14 is driven by a shaft 16 journaled in the gear box 10. The shaft 16 is connected by a universal joint 17 with a shaft 18 and the latter which is preferably composed of telescoping sections may be fitted with a manually operated clutch 18ª connected with a shaft 18ᵇ geared to the shaft of the prime mover M of the tractor. Projecting upwardly from opposite sides of the upper member of the fifth wheel and integral therewith are pedestals 19, 19 (see Figure 6) in which are mounted transverse coupling bars 20, 20. Extending in a longitudinal direction across the face of the upper member of the fifth wheel from the respective pedestals 19 are guide flanges 21 integral therewith. A pair of guide castings 22 are pivoted by bolts 23 at the upper ends to the lower member of the fifth wheel and at the lower ends are provided with slotted lugs 24, through which extends a transverse shaft 25 supported by brackets 26 which are in turn bolted to the side sills of the tractor frame. Projecting downwardly from the lower member of the fifth wheel are brackets 27 integral with which are laterally extending lock pin 28 adapted to be lodged—when the fifth wheel is depressed—in the recess formed in the latch bracket 29 riveted to the side sills 1 of the frame. A spring actuated latch bar 30 mounted in the latch bracket secures the lock pin 28 when seated in the bracket; the latch bar being fitted with a cord 31 leading to the cab of the tractor to provide convenient means for manually releasing the latch. Secured to the upper member of the fifth wheel is a bracket 32 in which is mounted a vertically movable pin 33 wedge-shaped at its lower end that it may be acted upon by the wedge-shaped latch 34 on the end of the spring actuated bar 35 in turn operated by a lever 36 pivoted at 37 to the upper member of the fifth wheel. Secured to the lever is a cord 38 leading to the cab of the truck for manually controlling the latch.

Attention will now be directed to the trailer C and the mechanism carried thereby for raising and lowering the supporting wheels (see Fig. 4).

Bolted to the side sills 50 of the trailer are bracket castings 51 bored to receive the slide bars 52 on which are mounted slidable castings 53 for the connecting bars 54 of the cross heads 55, respectively provided with right and left hand screw threads to receive the right and left screw threaded shaft 56,—journaled in the cross members 57 which are in turn bolted to the side sills of the frame. D, denotes a turn table and to its lower plate 58 is journaled the axle 59 of the supporting leg wheels 60. The upper plate 58ª of the turn table is connected to the lower plate by a king pin 61. Pivoted to lugs on the upper plate of the turn table and also to the slidable castings 53, are a plurality of supporting arms 62. Mounted upon the shaft 56 is a sprocket wheel 63, driven by a sprocket chain 64, from a sprocket wheel 65 on the shaft 66 journaled in brackets 67 which are in turn bolted to the side sill of the trailer. 68 is a worm gear on the shaft 66 driven by a worm 69 on the manually operated crank shaft 70. In spaced relation to the end sill 71 of the trailer is a channel member 72 bolted to the side sills;—and bolted to the channel member 72 and to the end sills adjacent to the side sills of the trailer are hub plates 73 to receive the ends of the guide bars 74 pinned at their ends to the hub plates. Spaced from the guide bars 74 are guide bars 75 which are also supported in the hub plates 73 bolted to the members 71 and 72. Slidable upon the guide bars 74 and 75 are castings 76 and mounted upon the guide bars 74 between the castings and the hub plates are springs 77 adapted to normally maintain the castings 76 medially disposed between the end sill 71 and the channel member 72. Extending transversely from lugs depending from the slidable castings 76 are cross bars 78 and 79 pinned at 76$^a$ to the lugs of the casting. Beneath the cross bars 79 is a rocking latch bar 80 journaled in stop lugs 80$^a$ (see Figure 9) terminating in a hook 80$^b$ integral with the slidable castings 76, said latch bar being secured against lateral movement by the pins 80$^c$. Bridging the space between the cross bars 78 and 79 and pinned thereto is a gear-box casting 81 (see Figure 8). Housed within the gear-box is a horizontally disposed beveled gear 82 splined to receive the rectangular end of a vertical shaft 83 movable through the gear, the lower end of the shaft being fitted with a yoke 84. Extending transversely through the shaft 83 is a projecting pin 85 adapted to be acted upon by a rocking forked member 86 mounted upon the rocking latch bar 80. In mesh with the gear 82 is a beveled pinion 87 mounted on a shaft 88 journaled in the wall of the gear-box and channel member 72, the end of the shaft being splined to receive one member of a clutch 89 to operably connect the shaft with the right and left screw threaded shaft 56. The clutch 89 is manually operated by a lever 90 pivoted to the cross member 72. 92 is a segmental rack bar secured to one of the side sills and 93 is a spring actuated dog carried by the lever 90 adapted to engage the segmental rack bar to maintain the clutch in its adjusted position.

Rigidly secured to the rocking latch bar 80 is a lever 94 which upon receiving the thrust of the vertically adjustable pin 33 is adapted to rock the latch bar thereby raising the latch hooks 95, 95,—secured to the latter,—out of coupling engagement with the transverse rocker-coupling bars 20, 20 synchronously with the lifting of the yoke-shaped end of the vertically movable shaft 83 from the transverse gear coupling shaft 13 by the tilting movement of the forked rocking member 86,—the latter being also secured to the rocking latch bar:—the tractor is thus fully released from its coupled relation with the trailer and may be driven away.

Bolted or rigidly secured to the frame of the trailer are slide guides 96 having arc-shaped ends 97 adapted to slide upon the hinged guide castings 22 of the tractor.

Having now indicated the several parts of my invention by reference characters the construction and operation of the same will be readily understood:

In coupling the trailer to the tractor the latter is backed into the trailer so that the projecting side guides 96 of the trailer strike the side flanges of the hinged guide castings 22 of the tractor, the pressure forcing them down and also the fifth wheel B to which they are hinged, against the pressure of the springs 6,—the latter serving only to raise the fifth wheel with no lifting action of the front end of the trailer resulting through contact with the guide castings 22. A further backing of the tractor brings the slide guides 96, 96 onto the rotatable upper plate of the fifth wheel and upon the slide guides contacting with the inclined guide flanges 21 of the fifth wheel the latter is forced into proper alinement. A further movement brings the arc-shaped ends 97 of the slide guides onto the transverse rocker coupling bars 20, 20 which forces the fifth wheel down still further against the action of the springs. The latch hooks 95, 95 are now forced upwardly through the contact of their inclined forward ends with the transverse coupling bars 20, 20, which thereby raises the rocking forked member 86 and the lever 94;—the forked member 86 bearing against the projecting pin 85 raises the vertical shaft 83; movable through the gear 82—the gear being held against upward movement by the walls of the gear case. The yoke 84 at the end of the shaft is thus disconnected from the gear coupling shaft 13 held in the yoke of the shaft 8, extending through the king bolt of the fifth wheel.

When the transverse rocking coupling bars 20, 20 reach the stop lugs 80$^a$ of the slidable castings 76, the latch hooks 95, 95 and the yoke 84 respectively drop by gravity into coupling relation with the transverse coupling bars 20, 20 and the gear coupling shaft 13 carried by the yoke of the shaft 8 of the worm gear 14, housed in the gear box 10 beneath the fifth wheel.

The clutch 18$^a$ may now be shifted to actuate the shafts 18 and 16, worm gear 14 and the shaft 8 which extends through the fifth wheel, to drive gears 82 and 87 of the right and left screw shafts 56—upon shifting the clutch 89 to couple the shaft 88 with the latter.

The supporting leg wheels 60 of the trailer may now be raised through the rotation of the right and left screw shaft 56 forcing apart the slidable castings 53, to which the frame of the turn table of the supporting wheels 60 are linked by the connecting members 62, the weight of the front end of the trailer is thus shifted to the fifth wheel of the tractor, forcing the latter completely down, the lock pin 28 sliding into the recess of the latch bracket 29 where it is caught by the spring latch bar 30—the tractor and trailer being there coupled ready for transit.

To uncouple the tractor from the trailer the driver first releases the spring latch bar 30 by pulling on cable 31 leading to the cab;—he then connects the power shaft of the prime mover M with the shafts 18 and 16 to operate worm gear 14 which rotates the shafts 18 and 83. The beveled gear 82 on shaft 83 is thus rotated revolving the pinion 87 mounted on shafts 88 and 56, the clutch 89 being in mesh. The right and left screw shaft being rotated draws the cross heads 55, 55 together thus lowering the supporting leg wheels 60 to the ground and raising the front end of the trailer to a predetermined height—several inches above the horizontal.

The fifth wheel and supporting table automatically rises with the front end of the trailer, the four coil springs 6 lifting the table of the fifth wheel,—held in position by the slide rods 3.

The latch hooks 95, 95 are now lifted by drawing on the cable 38 which forces inwardly the bar 35 by means of the lever 36. The wedge-shaped latch 34 on the end of the bar 35 forces upwardly the movable pin 33 which acting upon the lever 94,—rigidly secured to the rocking latch bar 80, lifts the latter thereby raising simultaneously the latch hooks 95, 95 and the rocking forked member 86, which in turn raises the yoke 84 at the end of the vertical shaft 83 out of coupling relation with the transverse shaft 13 supported by the tines of the yoke of the shaft 8; the truck is now released from the trailer and may be driven away leaving the trailer with the front end raised above the horizontal.

If desired the trailer when uncoupled from the tractor may be adjusted to raise and lower its forward end by operating the crank shaft 70 actuated by a removable crank arm,—geared to the right and left screw shaft 56, by rotating which the supporting wheels may be raised or lowered.

It will be noted that the gear box casting 81 is pinned to the cross bars 78, and castings 76 slidably supported upon the parallel bars 74 and 75, and the stress of starting and stopping is relieved by the springs 77 mounted upon the parallel bars.

Figure 10:
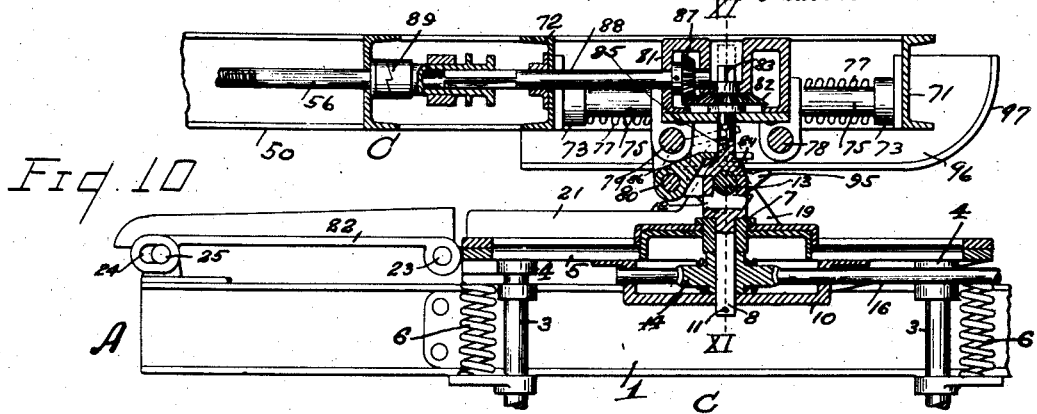
Figure 10 is a longitudinal vertical sectional view on enlarged scale of a detail showing the tractor coupled with the trailer, and in dotted lines the latch lock and yoke shaft raised as when the trailer is released from the tractor.

To allow for the backward and forward motion of the power shaft it is splined to a tubular member of the clutch 89—see Figure 10—the bore in the clutch member being greater in depth than the movement of the shaft. The clutch 89 is employed when the trailer is coupled to the tractor and the splined shaft 83 is utilized for a "power take off" when operating other devices previously referred to—as for example a dump mechanism, said devices however form the subject matter of other applications;—when employed the supporting leg may be raised and remain raised until it is again necessary to support the forward end of the trailer.

Having thus described my invention what I claim is:

1. In combination with a tractor and trailer, a fifth wheel mechanism movable upwardly and downwardly, guiding means for the fifth wheel mechanism, resilient means for yieldingly supporting the fifth wheel mechanism in an elevated position, inclined guide-ways flexibly connected with the tractor frame and with the fifth wheel mechanism, a coupling unit carried by the fifth wheel mechanism of the tractor, a coupling unit carried by the trailer adapted to automatically co-ordinate with the coupling unit carried by the tractor upon backing the tractor into the trailer whereby the inclined flexibly connected guide-ways of the fifth wheel mechanism may depress said fifth wheel mechanism to secure a coupling relation between said coupling units of the tractor and trailer.

2. In combination with a tractor and trailer, a fifth wheel mechanism, springs for yieldingly supporting the fifth wheel mechanism in an elevated position, inclined guides flexibly connected with the tractor frame and with the fifth wheel mechanism, transverse coupling bars carried by the fifth wheel mechanism, a rocking latch bar journaled in the frame of the trailer fitted with latch hooks adapted to automatically engage the transverse coupling bars of the fifth wheel upon backing the tractor into the trailer, whereby the pressure of the latter will depress the fifth wheel mechanism so that the coupling latch hooks of the trailer may engage the transverse bars of the tractor fifth wheel mechanism and means adapted to tilt said rock shaft, whereby the latch hooks may be released from their coupling relation.

3. In combination with a tractor and trailer, a resiliently supported fifth wheel mechanism mounted upon the tractor including a coupling unit, a coupling unit carried by the trailer adapted to couple with the coupling unit carried by the fifth wheel mechanism upon backing the tractor into contact with the trailer, whereby the pressure of the latter upon the fifth wheel mechanism may depress the fifth wheel mechanism to effect co-ordination between the coupling unit of the tractor and the coupling unit of the trailer, and manually released means for automatically locking said fifth wheel mechanism when depressed to its lowermost position.

4. In combination with a tractor and trailer, a yieldingly supported fifth wheel mechanism mounted upon the tractor including a pair of transverse coupling bars, a coupling unit carried by the trailer embodying a rock shaft and latch hooks adapted to engage said transverse bars upon backing the tractor into contact with the trailer, whereby the pressure of the latter will depress the fifth wheel mechanism together with the transverse latch bars, that the latch hooks may engage the transverse latch bars to effect a coupling relation between the tractor and trailer, and manually operated means for actuating said rock shaft to disengage the latch hooks from the transverse coupling bars of the fifth wheel mechanism.

5. In combination with a tractor, a trailer having rear wheels, means for adjustably supporting the forward end of the trailer when detached from the tractor, an adjustable fifth wheel mechanism carried by the tractor adapted to co-operate with means carried by the trailer for effecting a coupling relation between the trailer and tractor, resilient means adapted to support the fifth wheel mechanism of the tractor in an elevated position to receive the forward end of the trailer for coupling therewith, and locking means for securing the fifth wheel mechanism in its lowermost position when depressed under the weight of the forward end of the trailer.

6. In combination with a tractor, a fifth wheel mechanism, resilient means for yieldingly supporting the fifth wheel mechanism in an elevated position, locking means for securing the fifth wheel in its lowermost position, a trailer having rear wheels and adjustable means for supporting its forward end, means carried by the fifth wheel of the tractor and co-operating with means carried by the trailer for coupling the latter to the tractor and means carried by the tractor and actuated by its prime mover adapted to co-operate with means carried by the trailer to raise or lower the forward end of the latter and to effect a coupling relation with the tractor.

7. In combination with a tractor, a trailer having rear wheels and adjustable means for supporting its forward end, an adjustable fifth wheel mechanism carried by the tractor, flexible guides pivoted to the fifth wheel mechanism and to the frame of the tractor to receive the forward end of the trailer whereby the latter may be guided into coupling relation with the tractor, resilient means adapted to support the fifth wheel mechanism and guides in an elevated position but adapted to be depressed under the weight of the trailer, coupling means carried by the fifth wheel of the tractor and co-operating means carried by the trailer for coupling the latter to the tractor, and means carried by the tractor and actuated by its prime mover adapted to co-operate with the means carried by the trailer to raise or lower the forward end of the latter and to effect a coupling relation with the tractor.

8. In combination with a tractor, a trailer having rear wheels and adjustable means for supporting its forward end, an adjustable fifth wheel mechanism carried by the tractor, flexible guides pivoted to the fifth wheel mechanism and to the frame of the tractor to receive the forward end of the trailer whereby the latter may be guided into coupling relation with the tractor, resilient means adapted to support the fifth wheel mechanism and guides in an elevated position but adapted to be depressed under the weight of the trailer, coupling means carried by the fifth wheel of the tractor and cooperating means carried by the trailer for coupling the latter to the tractor, means carried by the tractor and actuated by its prime mover adapted to co-operate with the means carried by the trailer to raise or lower the forward end of the latter and to effect a coupling relation with the tractor, and manually operated means for operating the means carried by the trailer for raising and lowering its forward end independently of the means carried by the tractor and actuated by the prime mover.

9. In combination with a tractor, a fifth wheel mechanism carried by the tractor, resilient means for yieldingly supporting the fifth wheel mechanism in elevated position, locking means for securing the fifth wheel in its lowermost position, a trailer having rear wheels with adjustable means for supporting its forward end, means carried by the fifth wheel of the tractor and co-operating means carried by the trailer for coupling the latter to the tractor, means carried by the tractor and actuated by its prime mover adapted to co-ordinate with the means carried by the trailer to raise or lower the forward end of the latter and to effect a coupling relation with the tractor, and manually actuated means for releasing said coupling means.

10. In combination with a tractor, a fifth wheel mechanism carried by the tractor, resilient means for yieldingly supporting the fifth wheel mechanism in an elevated position, locking means for securing the fifth wheel in its lowermost position, a trailer having rear wheels and adjustable means for supporting its forward end, means carried by the trailer and co-operating with means carried by the tractor for coupling the tractor to the trailer, said coupling means carried by the trailer being adapted to oscillate longitudinally to relieve the stress of starting and stopping, means carried by the tractor and actuated by its prime mover adapted to co-ordinate with the means carried by the trailer to raise or lower the forward end of the latter and to effect a coupling relation between the coupling means of the tractor and trailer, and manually operated means adapted to be actuated from the cab of the tractor for releasing said coupling means.

11. In combination with a tractor, a fifth wheel mechanism carried by the tractor, resilient means for yieldingly supporting the fifth wheel mechanism in an elevated position, a shaft extending upwardly through the fifth wheel mechanism actuated by the prime mover of the tractor, a trailer having rear wheels with adjustable means for supporting its forward end, a right and left screw threaded shaft co-ordinating with said adjustable means for supporting the forward end of the tractor, a shaft journaled in alinement with said last named shaft, means for coupling the last two shafts together adapted to permit a longitudinal movement of one shaft with reference to the other shaft, a pinion mounted on the end of said last named shaft, a gear in mesh with said pinion, a gear case adapted to carry the pinion and gear, means for supporting said gear case for a longitudinal movement, a vertically movable shaft splined to the gear adapted to be coupled with the shaft extending through the fifth wheel mechanism, a rock shaft journaled in the frame of the trailer, a forked member pinned to the rock shaft adapted to raise the vertically movable shaft out of coupling relation with the fifth wheel shaft, latches carried by said rock shaft adapted to engage co-operating coupling means carried by the tractor, a lever secured to said rock shaft and manually operated means adapted to act upon said lever, whereby the shaft may be actuated to release the trailer from coupling relation with the tractor and to disconnect the power driven shaft of the trailer from the power driven shaft of the tractor.

12. In combination with a tractor, a fifth wheel mechanism carried by the tractor, a vertically disposed shaft extending through the fifth wheel actuated by a gear driven by the prime mover of the tractor, a trailer having rear wheels mounted on an adjustable frame for supporting its forward end, a right and left screw threaded shaft carried by the trailer for actuating said adjustable frame of the supporting wheels, a gear in mesh with a pinion journaled in a gear case longitudinally slidable in the frame of the trailer, resilient means for normally maintaining said gear case in a neutral position, a vertically movable shaft keyed to the gear adapted to be coupled with the vertically disposed shaft extending through the fifth wheel, means for coupling said trailer to the tractor and simultaneously operated means for disconnecting said coupling means and for disconnecting the vertically movable shaft of the trailer from the vertical shaft extending through the fifth wheel of the tractor.

13. In combination with a tractor and trailer, a fifth wheel mechanism movable upwardly and downwardly, means for yieldingly supporting the fifth wheel mechanism in an elevated position, means for automatically coupling the tractor with the trailer upon backing the tractor into contact with the trailer whereby the fifth wheel mechanism of the tractor may be depressed to effect said coupling relation with the trailer, said coupling means including inclined guides connected to and carried by the fifth wheel mechanism in the upward and downward movement thereof.

14. In combination with a tractor and trailer, a fifth wheel mechanism movable upwardly and downwardly, means for yieldingly supporting the fifth wheel mechanism in an elevated position, means for automatically coupling the tractor with the trailer upon backing the tractor into contact with the trailer whereby the fifth wheel mechanism of the tractor may be depressed to effect said coupling relation with the trailer, said coupling means including inclined guides hinged at their upper ends to the fifth wheel mechanism and carried by the same in the upward and downward movements thereof, the lower ends of the guides being slidably connected with the tractor.

In testimony whereof, I sign this specification.

CHARLES H. LAND, Jr.